F. H. KNIGHT.
CARBURETER.
APPLICATION FILED JULY 23, 1906.
937,536.
Patented Oct. 19, 1909.
2 SHEETS—SHEET 1.
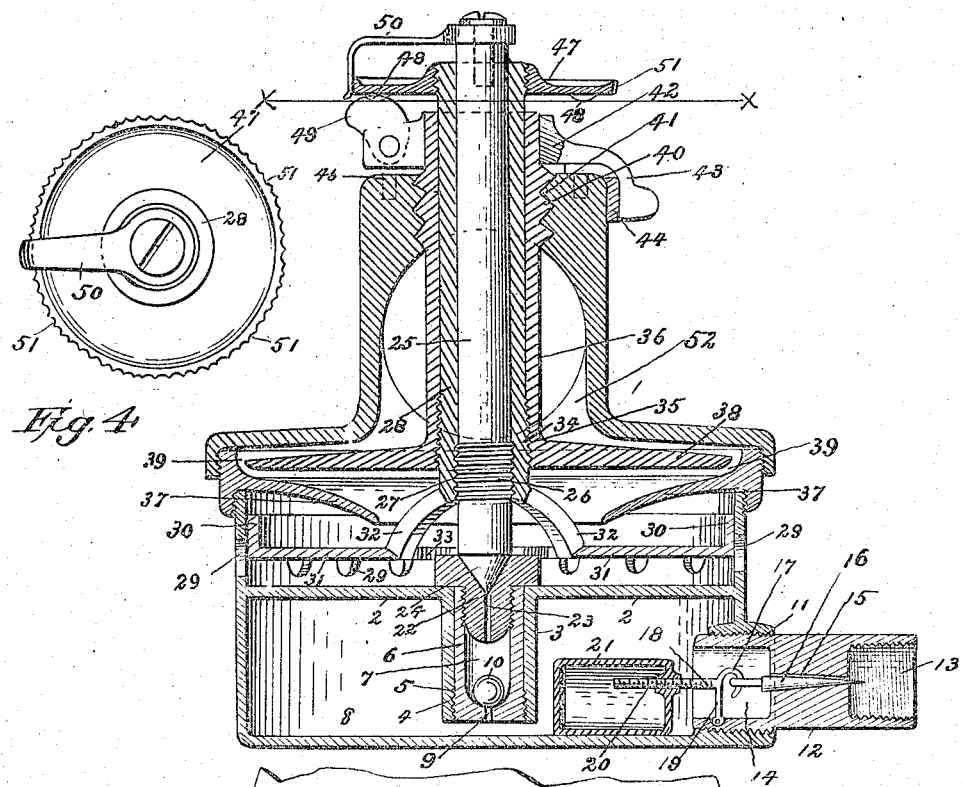
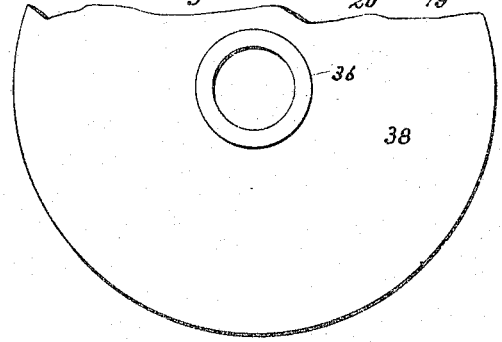

F. H. KNIGHT.
CARBURETER.
APPLICATION FILED JULY 23, 1906.

937,536.

Patented Oct. 19, 1909.
2 SHEETS—SHEET 2.

Witnesses
F. L. Ourand
G. M. Knight

Inventor
Frank H. Knight
William H. H. Knight
By his Attorney

UNITED STATES PATENT OFFICE.

FRANK H. KNIGHT, OF WASHINGTON, DISTRICT OF COLUMBIA.

CARBURETER.

937,536.     Specification of Letters Patent.     Patented Oct. 19, 1909.

Application filed July 23, 1906. Serial No. 327,343.

*To all whom it may concern:*

Be it known that I, FRANK H. KNIGHT, a citizen of the United States, residing at Washington, in the District of Columbia, have invented certain new and useful Improvements in Carbureters, of which the following is a specification.

My invention while broadly relating to the general class of carbureters, and while applicable for use in connection with devices of any and every kind, wherein carbureters are used, is yet more particularly designed for and adapted to be used in connection with motors wherein piston action is due to, and consequent upon the explosion of a mixture of hydro-carbon, (preferably in fluid form) and atmospheric air, of which type of motors, gas and gasolene engines are notable examples, and said invention has for its object the provision, in a device of the character named, of means whereby a predetermined quantity of hydro-carbon is admitted to and maintained within the reservoir or supply chamber of the device; of means whereby the hydro-carbon is withdrawn as needed from the reservoir, and conducted to the vaporizing, and mixing chamber; of means whereby the proper quantity of air to be admitted to the mixing chamber, as regards quantity of hydro-carbon for successive charges of the motor, is predetermined and maintained; of means whereby the quantity of mixed hydro-carbon and atmospheric air entering the cylinder at each intake of the motor may be accurately determined and controlled; of means whereby the quantity of the explosive mixture entering the motor cylinder at each intake of the motor may be increased, or lessened while the device is in operation, and without changing the relative proportions of the component parts of said mixture; and finally of means whereby the several desirable functions above set forth are fulfilled within a device wherein durability is combined with cheapness of construction and simplicity of action.

Figure 9:
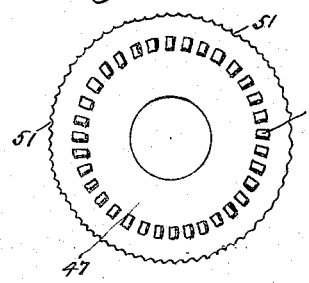
Figure 5:
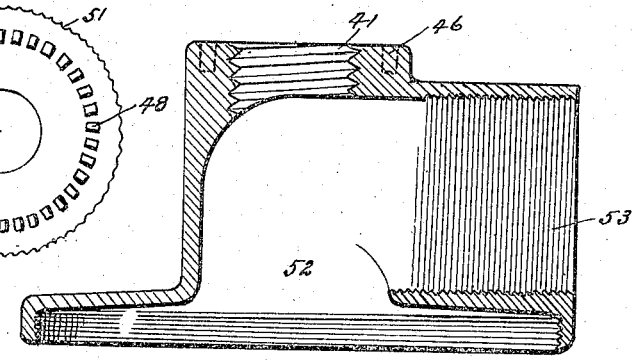
Figure 6:
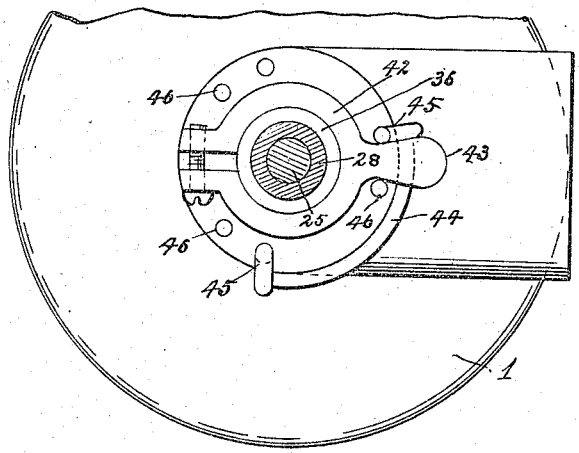
Figure 7:
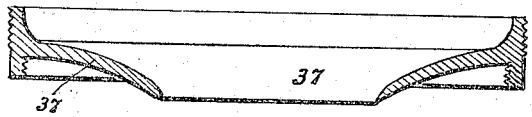
Figure 8:
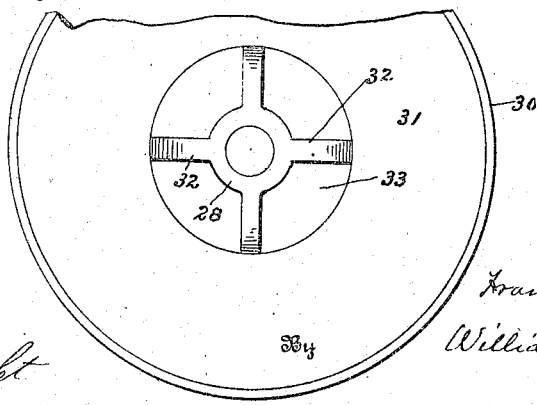

To the accomplishment of the foregoing described ends the invention consists, in the construction, arrangement and combination of the several parts comprised therein for service substantially as is hereinafter set forth, and illustrated in the accompanying drawings wherein;

Figure 1, is a transverse longitudinal section taken through a carbureting and mixing apparatus constructed in accordance with my invention. Fig. 2, is a partial plan view of the movable diaphragm or valve whereby the flow of explosive mixture, (when ready for use in my device) from the vaporizing and mixing chamber, to the motor cylinder is controlled, said diaphragm or valve shown detached from the machine. Fig. 3, is a side elevation of part of the diaphragm shown in Fig. 2. Fig. 4, is a plan view of the device whereby the flow of liquid hydro-carbon from the reservoir to the vaporizing and mixing chamber, is controlled. Fig. 5, is a sectional view of a part of the casing of my improved carbureter, detached from the device to show, in part, the means whereby the carbureter is connected with the engine cylinder. Fig. 6, shows in plan view the parts of my improved carbureter below the line x. x. of Fig. 1. Fig. 7, is a transverse sectional view of that portion of the device to which the upper and lower parts of the carbureter are respectively connected, and which, in itself forms the side walls and deflecting flange of the vaporizing or mixing chamber. Fig. 8, is a plan view of the air port controlling valve, detached from the device; and: Fig. 9, shows in plan view the lower surface of the valve locking disk, at upper part of the device.

Referring to the drawings, wherein similar figures of reference denote similar parts, 1, designates the inclosing casing which I preferably make cylindrical in cross section, and in several independent parts arranged to be connected together as shown in Fig. 1.

I preferably divide the interior of the casing into upper and lower compartments by a partition 2, which in the present instance is shown as cast, or rigid with the casing sides, but which, if desired, may be in any desired manner connected to said sides, and I provide the said partition 2, at or near its middle with a depending tubular portion 3, provided at its bottom with female screw threads 4, to engage corresponding male screw threads 5, formed upon the lower end of a short plug 6, which extends and is held within the tubular portion 3, of the partition 2, as shown, see Fig. 1.

I preferably provide the plug 6, with a hollow or chambered out portion 7, which extends nearly to the bottom of said plug, and I connect said chambered out portion 7, with the lower compartment 8, of the casing, by a small passage way 9, which extends through the bottom of the plug 6, as shown, a ball 10, held within the chambered portion 7, of the plug operates to close the upper end of the passage way 9, for a purpose presently to be explained.

It is to be understood that the compartment 8 forms the liquid hydro-carbon receiving, and holding reservoir of the device, that the said liquid hydro-carbon is maintained at a predetermined depth within said reservoir, by appliances presently to be described, and that such hydro-carbon is withdrawn from said reservoir as needed, by the reciprocation of an engine piston, as will be presently fully set forth herein.

To the end of maintaining a predetermined quantity of liquid hydro-carbon within the reservoir 8, as above noted, I provide said reservoir, at one side with a screw threaded aperture 11, to receive the screw threaded inner end of a plug 12, which is chambered out at its opposite ends, as shown at 13, and 14, respectively see Fig. 1. I provide the outer chambered end 13, of the plug 12, with screw threads to engage the screw threaded end of a suitable supply pipe that extends thence to a source of liquid hydro-carbon supply not shown herein. I connect the chambered portions 13, and 14, of the plug 12, with a small tapering, or cone shaped passage way 15, which receives a suitable cone shaped plug 16, the shanked inner end of which extends within the chamber 14, of the plug 12, and is provided with an eye, to engage a hook 17, formed upon a bell crank lever 18, one arm 19, of which is hinged at its outer end to the plug 12, within the chamber 14, while the remaining arm 20, of said lever is screw threaded, to engage a screw threaded aperture formed in one end of a float 21, see Fig. 1.

By the above described construction of parts it will be readily apparent that the upward movement of the float 21, due to the rise of liquid within the reservoir 8, when charging the same, will operate to force the cone shaped plug 16, into close contact with the sides of the passage way, through the lever 18, thus closing said passage way to the flow of liquid hydro-carbon therethrough, it will also be apparent that the quantity, or depth of liquid hydro-carbon to be maintained in the reservoir may be accurately predetermined by the construction described; and further that the force or pressure with which the plug 16, is held in contact with the sides of the aperture 15, may be readily increased, or decreased by simply moving the float 21, inwardly, or outwardly upon the threaded arm 20.

For convenience I shall hereinafter refer to the parts immediately above described as the reservoir supply valve.

Referring again to the plug 6, within the pendent portion of the partition 2, I preferably provide said plug, at its upper end, within the chambered portion 7, thereof, with female screw threads, to receive corresponding male screw threads formed upon a headed plug 22, which closes the upper end of said chamber 7, as shown. I provide the plug 22, with an aperture 23, which extends through the said plug and is at its upper end made cone shaped to closely fit the lower cone shaped end 24, of a vertically movable rod 25, which extends thence upwardly and through the top of the carbureter, see Fig. 1. I provide the rod 25, preferably at its lower end with male screw threads 26, which engage with female screw threads 27, formed in the inner lower end of a tubular shaft 28, which extends from a point near the lower end of the rod 25, upwardly and through the top of the carbureter for a purpose presently to be described, see Fig. 1.

By reference to Fig. 1, it will be understood that the rod 25, will, when rotated in opposite directions, be moved up, or down in the tubular shaft 28, and its cone shaped lower end 24, into and out of contact with the cone shaped upper end of the passage way 23, through the construction and arrangement of parts last above described, and as the liquid hydro-carbon is to pass through such passage way 23, from the reservoir 8, therebelow to the vaporizing, and mixing chamber above, it will be clear that rotation of said rod 25, will fully control and determine the flow of said hydro-carbon, as to quantity, through such passage way 23, I provide that the rod 25, shall be adjusted, and when so adjusted be held in proper position by suitable mechanism presently to be described. I provide that atmospheric air shall be admitted to the vaporizing chamber above the reservoir, and that the quantity of air, so admitted, shall be accurately predetermined and gaged, and to such ends I provide the casing 1, with a series of apertures 29, immediately above the partition 2, of the reservoir 8, through which air may freely pass to, and into said vaporizing chamber; to determine the quantity of air so admitted I provide that the inner tooled surface of the casing shall be closely contacted by an upwardly turned flange 30, which is formed upon the outer edge of a vertically movable disk 31, that is rigidly secured through arms 32, that span an opening 33, formed through the middle of said disk, to the lower end of the tubular shaft 28, see Figs. 1, and 8. I provide that the disk 31, and its connected flange 30, shall be moved upwardly, or downwardly to open, or to close the ports 29, by the rotation through suitable mechanism, presently to be described, of the shaft 28, to which said disk is connected, and to such end I provide said shaft 28, at its lower end with male screw threads 34, which engage female screw threads 35, formed in the inner surface of a tubular shaft 36, (within which the shaft 28, is placed) at the lower end thereof, see Fig. 1. It is to be understood that the space immediately above the top 2, of the liquid hydro-carbon receptacle or reservoir 8, in which space the disk 31, is placed, and moves, is in reality the mixing and vaporizing compartment of my device, as therein the liquid hydro-carbon and atmospheric air, drawn respectively through the passage way 23, and ports 29, by the action of the motor piston as will be presently explained, are brought into contact, and mixed, the said hydro-carbon now being in a gaseous condition.

I provide that the explosive compound, resulting from the mixture of air and fluid hydro-carbon as above noted, shall be drawn from the mixing and vaporizing compartment in a predetermined flow, or quantity per stroke, or number of strokes of the motor piston to be actuated thereby; I also provide that such flow, or quantity per stroke, or number of strokes of said motor piston, may be adjusted or changed at will, and to said ends I provide the interior of the casing near the top of the vaporizing and mixing compartment noted with an inwardly projecting flange 37, preferably downwardly inclined, see Fig. 1, and immediately above said flange 37, I so arrange a diaphragm 38, that it may be moved toward and from the flange to lessen, or increase the space 39, between the lower edge of said diaphragm and top of said flange 37, through which the explosive compound passes from the mixing chamber to the motor cylinder.

To the end above noted I provide that the diaphragm 38, shall be rigidly connected to the tubular shaft 36, at the lower end thereof, and that the said shaft 36, shall be provided near its upper end with male screw threads 40, to engage with corresponding female screw threads 41. formed in the top of the casing 1, see Fig. 1. To insure quick action as regards the opening or closing of the passage 39, about the diaphragm 38, I provide that the screw threads 40, and 41, shall be of large pitch, so that but a slight rotation of the shaft 36, will operate to move the diaphragm 38, into, or form contact with disk 37. as will be readily understood.

I provide that the valve rod 25, and tubular shafts 28, and 36, may be moved either simultaneously, or independently each of the other, and to such end I provide the outer shaft 36, within which the remaining shaft 28, and rod 25, are arranged, at its top with a controlling yoke 42, and provide said yoke, at one side with a downwardly turned arm 43, which lightly bears upon a rod, or plate 44, that, curved to snugly fit the exterior of the casing, (at this point of small diameter) is provided at its opposite ends with abutments 45, against which the arm 43, impinges, the which loops, or abutments extend upwardly and over the edge of the casing top, and are downwardly bent to enter either one of a series of apertures 46, which are formed in the casing top for such purpose, see Figs. 1, and 6, by reference to which it will be seen that the lateral movement of said arm 43. is limited to the distance between the loops, or abutments 45, of the plate 44. Reference to the figures named will also clearly show that the plate 44, may be moved at will, and the downwardly projecting portions of the loops, or abutments 45, upon said plate caused to enter any of the apertures 46, other than those with which they are shown as engaged.

From the construction, last above described, it will be readily understood that the tubular shaft 36, and its connected diaphragm 38, may be adjusted up or down, as is desired, to increase or diminish the passage-way 39, about the diaphragm 38, and that when the desired adjustment has been made, variation therefrom, will be determined and limited by the loops, or abutments 45, of the rod, or plate 44, above described, against which the arm 43, will impinge when said rod, or plate is in position on the casing, and the said arm is moved.

It will be understood that the rod, or plate 44, is removable from the casing, for the purpose of adjusting the tubular shaft 36, and its connected diaphragm 38, up and down, and that when the said rod, or plate is in position a slight up and down adjustment of the parts named may be had, such latter named adjustment determined and limited by the loops, or abutments 45, of the plate 44, as above set forth.

I provide that the tubular shaft 28, (within the shaft 36,) and its connected flanged disk 31, shall, after it has been rotated to move said flanged disk up or down and thus open or close the ports 29, be held at any desired point of such rotation, and to such end I provide the upper end of said shaft 28, with a disk 47, and I provide said disk, upon its lower surface with a series of small projections 48, arranged concentric with the center of said disk and adapted to co-act with a swinging pawl, or clip 49, hinged to the yoke 42. to hold disk 47, from rotation.

By reference to Figs. 1, and 6, in the former of which the parts last above described are shown in connection, it will be observed that the clip, or pawl 49, is pivoted between the separated flanged end of the yoke 42, upon the bolt or screw by which the said yoke is tightened upon the shaft 28;

also that said clip, or pawl is free to be moved into and from contact with, or between adjoining projections 48, of the disk 47. I provide that the valve rod 25, after it has been rotated to open or close the passage way 23, (as hereinbefore described,) be held at any desired point of adjustment to which end, I provide the upper end of said rod 25, with a projecting arm, 50, the outer end of which is turned downward to engage with any desired one of a series of detents 51, formed in the outer edge of the disk 47, see Figs. 1. and 4. The space 52, immediately above the diaphragm 38, is open to the motor cylinder through pipe, not shown herein, which connects with screw threads 53, formed about a circular opening at one side of said space 52, see Figs. 1. and 5. By reference to the drawing, Fig. 1, it will be readily seen that the explosive mixture may contain a greater, or less quantity of either of its ingredients, since it is only necessary to adjust, through their respective disk 47, and arm 50, the air vent controlling disk 31, or the needle valve rod 25, as desired; it will also be apparent that, the proper desired proportion of hydro-carbon, and air having been determined and fixed, through the adjustable devices hereinbefore set forth; the flow of the mixture through my improved carbureter may be instantly determined, and controlled through the rotation, and consequent raising or lowering of the diaphragm 38, without altering, in any way, such desired proportion named, since the devices which control the hydrocarbon, and air admitting valves are connected to be moved by the devices which hold and control said diaphragm.

The operation of my improved carbureter is very simple, and is as follows, a suitable carbureting liquid, in the present case gasolene, is fed from a supply reservoir through a suitable conductor to and through passage, or port 15, to the receptacle 8, in casing 1, the quantity so entering such receptacle being determined by the float 21, and its connected valve, and from said receptacle the liquid is drawn through the valve controlled passages 9, and 23, by the action of the motor piston, to the vaporizing space above the top of the receptacle 8, where the hydrocarbon meets, and becomes mixed with air, also drawn by the said action of the motor piston through the ports 29, into the casing. From the vaporizing compartment the combined air and hydro-carbon is forcibly sucked, or drawn to, and through the passage way 39 about the diaphragm 38, and to and into the motor cylinder, by the continued action of the motor piston, the hydro-carbon in its passage through the several ports, and passage ways described, becomes more thoroughly vaporized and united with the air, with which it now is mixed. The sleeves 36, and 28, controlling the diaphragm and air valve respectively, and rod or stem 25, of the needle valve 24, as arranged form a nested shaft and will be so referred to in the claims appended hereto.

Further description of the device, or of its operation is not deemed necessary, as both will be readily understood by the description herein contained taken in connection with the drawings which form a part of this specification.

What I claim and desire to secure by Letters Patent is:

1. In a carbureter a casing having its central portion provided with a downwardly inclined flange, a movable diaphragm above said inclined flange said diaphragm apertured for the passage therethrough of air and hydrocarbon valve shafts, there being a passageway between the upper surface of said flange and the lower outer edge of the diaphragm, means to adjust the diaphragm toward the flange to control the passage of an explosive compound through the passageway between the diaphragm and the inclined flange, a vaporizing compartment below the diaphragm, ports to admit air and a carbureting fluid into the vaporizing compartment to become thoroughly mixed when drawn from said compartment through the passageway between the diaphragm and the inclined flange to the space above the diaphragm, valves to control the passage through the air and hydro-carbon ports which open to the vaporizing compartment, and air and hydrocarbon valve shafts to control the air and hydro-carbon valves, substantially as described.

2. In a carbureter a casing having its central portion provided with an inwardly projecting flange, said flange, a movable diaphragm within the central portion above the inclined flange, a passageway between the lower outer edge of the diaphragm and the inclined flange, means to positively adjust the diaphragm toward the inclined flange, a vaporizing compartment below the diaphragm, valve controlled ports to admit air and a carbureting fluid to the vaporizing compartment below the diaphragm to mix therein and to be drawn thence through the passageway between the diaphragm and the inclined flange, and means to adjust the valves which control the air and hydro-carbon ports and thereby to positively determine the proportion of air and carbureting fluid which are to be drawn into the vaporizing compartment to be mixed therein, substantially as described.

3. A casing, a receptacle to hold a liquid hydro-carbon within said casing, a vaporizing compartment above said liquid receptacle, a passage opening from said receptacle to said vaporizing compartment to admit the carbureting liquid to said compartment, passages opening through the casing to admit air to the vaporizing compartment, valves to control said passages, a movable diaphragm forming the top of the vaporizing compartment and provided with a passageway thereabout through which an explosive compound is drawn from the vaporizing compartment, and means to independently adjust the diaphragm and the air and hydro-carbon controlling valves, substantially as described.

4. In a carbureter a casing, a carbureting liquid receptacle within said casing, a vaporizing compartment within said casing above the liquid receptacle therein, passages opening through the casing and from the liquid receptacle to admit air and a carbureting agent to the vaporizing compartment, valves to control said passages, an adjustable diaphragm forming the top of the vaporizing compartment and provided with a passageway thereabout to permit the passage of an explosive compound from the vaporizing compartment to pass the diaphragm, a centrally disposed nested shaft comprising independent members connected to move the diaphragm the air and the carbureting liquid valves, and means to independently adjust said diaphragm air and carbureting liquid valves, substantially as described.

5. In a carbureter a casing, an adjustable diaphragm within said casing to divide the interior of the same into a vaporizing compartment wherein an explosive compound is formed and a storage compartment for such explosive compound, a valve controlled passage opening from a carbureting liquid receptacle to the vaporizing compartment, a valve to control such passageway, valve controlled passages to admit air to the vaporizing compartment, valve to control said passages, and means to simultaneously adjust the air and carbureting liquid valves to determine the quantity of fluid passing through the passages controlled thereby to the vaporizing compartment and the diaphragm to determine the quantity of fluid passing from the vaporizing compartment to the storage compartment without changing the relative proportions of said fluids, substantially as described.

6. In a carbureter a casing, a diaphragm within said casing to divide the interior thereof into a vaporizing compartment and a fluid storage compartment, independent air and hydro-carbon passages opening to said vaporizing compartment, a centrally disposed tubular shaft 36 extending from the diaphragm through the casing top to be moved and to move said diaphragm, a valve to close the air ports opening to the vaporizing compartment, a tubular shaft 28 rigid with the air valve and journaled in the tubular shaft 36 to be moved and to move the air valve, a hydro-carbon receptacle, a valve to close the passage between the hydro-carbon receptacle and the vaporizing compartment, a rod or stem 25 connected to the latter named valve and journaled in the tubular shaft 28 to be moved and to move the valve thereon, a device connected to one end of each of the tubular shafts 36 and 28 and the rod 25 through which movement is imparted to the said tubular shafts and rod and their connected diaphragm and valves when either thereof is to be independently adjusted, and adjustable means whereby the tubular shafts 36 and 28 and the rod 25 may be connected together to be simultaneously operated to move their respective diaphragm and valves in unison when the independent adjustment of each thereof has been determined, substantially as described.

7. The combination with a carbureter casing, and with an arm connected to move valves within said casing, of a movable plate 44 having abutments thereon to contact with the valve moving arm to limit the movement of said arm, and means substantially as described to arrange said plate at different points upon said casing, as and for the purpose specified.

In testimony whereof I hereto affix my signature in presence of two witnesses.

FRANK H. KNIGHT.

Witnesses:
J. EDW. FOWLER,
S. C. HILL.